United States Patent
Byun et al.

(10) Patent No.: US 10,171,271 B2
(45) Date of Patent: Jan. 1, 2019

(54) METHOD AND DEVICE FOR TRANSMITTING INTERFERENCE CANCELLATION INFORMATION FOR CANCELLING INTERFERENCE BETWEEN CELLS

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Hyeyoung Choi, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/506,227

(22) PCT Filed: Nov. 17, 2014

(86) PCT No.: PCT/KR2014/011011
§ 371 (c)(1),
(2) Date: Feb. 23, 2017

(87) PCT Pub. No.: WO2016/043380
PCT Pub. Date: Mar. 24, 2016

(65) Prior Publication Data
US 2017/0310511 A1    Oct. 26, 2017

Related U.S. Application Data

(60) Provisional application No. 62/051,266, filed on Sep. 16, 2014.

(51) Int. Cl.
*H04W 72/08*    (2009.01)
*H04L 25/03*    (2006.01)
(Continued)

(52) U.S. Cl.
CPC ..... *H04L 25/03821* (2013.01); *H04B 7/0452* (2013.01); *H04B 7/0621* (2013.01);
(Continued)

(58) Field of Classification Search
CPC . H04L 25/03821; H04L 1/0009; H04L 1/203; H04W 72/082; H04W 52/243; H04J 11/005; H04B 7/0621
See application file for complete search history.

(56) References Cited

U.S. PATENT DOCUMENTS

2004/0127223 A1*  7/2004  Li ............... H04B 7/022
                                                          455/446
2011/0081871 A1*  4/2011  Molnar .......... H04L 1/0007
                                                          455/67.13
(Continued)

FOREIGN PATENT DOCUMENTS

| WO | 2011119750 | 9/2011 |
|---|---|---|
| WO | 2013135475 | 9/2013 |

OTHER PUBLICATIONS

European Patent Office Application Patent No. 14902033.1, Search Report dated Feb. 1, 2018, 7 pages.
(Continued)

*Primary Examiner* — Michelle M Koeth
(74) *Attorney, Agent, or Firm* — Lee, Hong, Degerman, Kang & Waimey PC (57) ABSTRACT

Provided are a method and a device for transmitting interference cancellation information for cancelling interference between cells in a wireless communication system. The method for transmitting interference cancellation information may comprise the steps of: on the basis of feedback information received from a terminal belonging to a cell controlled by a predetermined base station, estimating a symbol error rate or a packet error rate on a cell boundary region; by comparing the symbol error rate or the packet
(Continued)

error rate with a predetermined critical value, determining a probability indicator indicating the probability of cancelling interference between cells at the cell boundary region; and transmitting information on the probability indicator to an adjacent cell.

11 Claims, 9 Drawing Sheets

(51) Int. Cl.
    *H04W 52/24*     (2009.01)
    *H04B 7/0452*     (2017.01)
    *H04L 1/20*     (2006.01)
    *H04B 17/309*     (2015.01)
    *H04L 1/00*     (2006.01)
    *H04B 7/06*     (2006.01)
    *H04J 11/00*     (2006.01)

(52) U.S. Cl.
    CPC .......... *H04B 17/309* (2015.01); *H04L 1/203* (2013.01); *H04W 52/243* (2013.01); *H04W 72/082* (2013.01); *H04B 7/0617* (2013.01); *H04J 11/005* (2013.01); *H04L 1/0003* (2013.01); *H04L 1/0009* (2013.01)

(56) References Cited

U.S. PATENT DOCUMENTS

2012/0020425 A1     1/2012     Lee et al.
2013/0033989 A1     2/2013     Barbieri et al.

OTHER PUBLICATIONS

3rd Generation Partnership Project (3GPP), "Technical Specification Group Radio Access Network; Study on UMTS heterogeneous networks (Release 12)," 3GPP TR 25.800 V12.1.0, Dec. 2013, 167 pages.

Feng, et al., "A New Interference Alignment Algorithm in the MIMO-OFDM System", Information Technology Journal vol. 12, Feb. 2013, 12 pages.

PCT International Application No. PCT/KR2014/011011, Written Opinion of the International Searching Authority dated Jun. 26, 2015, 4 pages.

* cited by examiner

METHOD AND DEVICE FOR TRANSMITTING INTERFERENCE CANCELLATION INFORMATION FOR CANCELLING INTERFERENCE BETWEEN CELLS

CROSS-REFERENCE TO RELATED APPLICATIONS

This application is the National Stage filing under 35 U.S.C. 371 of International Application No. PCT/KR2014/011011, filed on Nov. 17, 2014, which claims the benefit of U.S. Provisional Application No. 62/051,266, filed on Sep. 16, 2014, the contents of which are all hereby incorporated by reference herein in its entirety.

BACKGROUND OF THE INVENTION

Field of the Invention

The present invention relates to a method and a device for transmitting interference cancellation information for cancelling interference between cells, and more particularly, to a method and a device for transmitting interference cancellation information based on the probability of interference cancellation.

Related Art

Recently, the commercialization of a Long-Term Evolution (LTE) system as a next-generation wireless communication system has been supported in earnest. The LTE system has rapidly spread with the recognized necessity to support not only voice services but also high-capacity services requested by users with high quality, securing the activity of a terminal user. The LTE system provides a low transmission delay, a high transmission rate, and improvements in system capacity and coverage.

With the appearance of high-quality services, demands for wireless communication services are rapidly increasing. To actively cope with such demands, it is first needed to increase the capacity of a communication system. To increase communication capacity in a wireless communication environment, a method of discovering a new available frequency band and a method of improving the efficiency of limited resources may be considered.

As the method for improving the efficiency of limited resources among the methods, multi-antenna transmission and reception technologies have been actively developed with great attention in recent years, in which multiple antennas are installed in a transceiver to additionally obtain a spatial area for resource utilization, thus obtaining a diversity gain, or data is transmitted in parallel through each antenna to increase transmission capacity.

A multi-antenna system may employ beamforming and precoding as a method for increasing a signal-to-noise ratio (SNR), and beamforming and precoding may be used to maximize an SNR through feedback information in a closed-loop system in which a transmitting end may use the feedback information.

SUMMARY OF THE INVENTION

One embodiment of the present invention proposes a method of setting up interference cancellation information based on interference cancellation probability to perform inter-cell interference cancellation in a flexible beamforming-applied communication system.

Another embodiment of the present invention proposes a method of exchanging statistical information between base stations in order to increase interference signal cancellation probability in a cell-edge area.

Still another embodiment of the present invention proposes a method of estimating an average symbol error rate or packet error rate in a cell-edge area.

Yet another embodiment of the present invention proposes a method of generating interference cancellation information based on an average symbol error rate or packet error rate in a cell-edge area.

A method for transmitting interference cancellation information according to an aspect of the present invention may include: estimating a symbol error rate or a packet error rate in a cell-edge area based on feedback information received from a terminal belonging to a cell controlled by a predetermined base station; determining a probability indicator that indicates a probability of cancelling interference between cells in the cell-edge area by comparing the symbol error rate or the packet error rate with a predetermined critical value; and transmitting information on the probability indicator to an adjacent cell.

According to an aspect of the present invention provides a method of exchanging statistical information between base stations in order to increase interference signal cancellation probability in a cell-edge area.

Accordingly, a base station may actively allocate an interference cancellation-capable terminal to an interference cancellation-capable resource, and the blind interference cancellation terminal receives information on characteristics of the allocated resource to reduce loads of unnecessarily performing interference cancellation.

DESCRIPTION OF EXEMPLARY EMBODIMENTS

The present specification is described based on a communication network, and operations implemented in the communication network may be performed by a system (for example, a base station) responsible for the communication network in controlling the network and transmitting data or may be performed by a terminal linked to the network.

Figure 1:
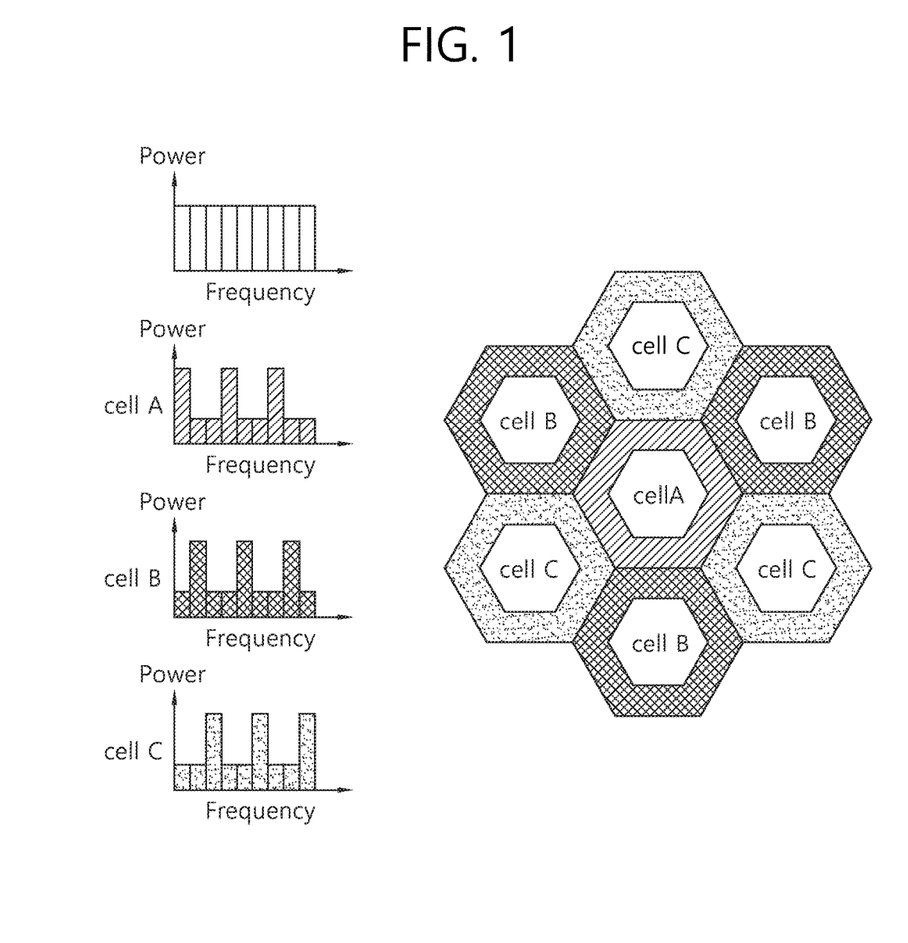
FIG. 1 illustrates inter-cell interference coordination in LTE.

FIG. 1 illustrates inter-cell interference coordination in an LTE system.

In the LTE system, each cell may be divided into inner and outer parts. In the inner part, where users experience a low level of interference and also require less power to communicate with the serving cell, a frequency reuse factor of 1 is adopted.

For the outer part, when the cell schedules a user in a given part of band, system capacity may be optimized if neighbouring cells transmit nothing or if neighbouring cells may performs transmission at low power probably to users in the inner parts of the neighbouring cells in order to avoid creating strong interference to the scheduled user in the first cell.

Such a restriction results in a higher frequency reuse factor at the cell edge, which is often known as partial frequency reuse, as illustrated in FIG. 1.

As illustrated, each of cells A, B, and C may be divided into inner and outer parts, and frequency resources for the edge of each cell are allocated to the cell so as not to overlap with those for adjacent cells. When a specified frequency resource is allocated to the outer part of cell A, the same frequency resource is not allocated to cell B and cell C. When a specified frequency resource is allocated to the outer part of cell B, the same frequency resource is not allocated to cell A and cell C. Likewise, when a specified frequency resource is allocated to the outer part of cell C, the same frequency resource is not allocated to cell A and cell B.

In order to coordinate scheduling in different cells in such a manner, communications between adjacent cells are required. When adjacent cells are managed by the same base station (BS, for example, eNodeB), a coordinated scheduling strategy may be implemented without a need for standardized signaling. However, when adjacent cells are controlled by different BSs, standardized signaling is important, particularly in multivendor networks.

Inter-Cell Interference Coordination (ICIC) in LTE is assumed to be managed in the frequency domain rather than the time domain, and inter-BS signalling is designed to support this, because time domain coordination may interfere with an operation of Hybrid Automatic Repeat reQuest (HARQ) processes, especially in an uplink where synchronous HARQ is used.

In relation to downlink transmission, a bitmap termed Relative Narrowband Transmit Power (RNTP) indicator may be exchanged between BSs over an X2 interface. Each bit of the RNTP indicator corresponding to one resource block (RB) in the frequency domain is used to inform neighboring BSs whether a cell is planning to maintain transmit power for the RB below a certain upper limit. The value of this upper limit and the period for which the indicator is valid are configurable.

For example, an RNTP indicator of 1 may indicate that a cell maintains transmit power for a specific RB, that is, transmits a signal via the RB. An RNTP indicator of 0 may indicate that the cell transmits no signal via the RB, that is, performs no beamforming.

This enables neighbouring cells to take into account an expected level of interference in each RB when scheduling UEs in their own cells.

In case of receiving an indication of high transmit power in an RB in a neighbouring cell, the reaction of the BS is not standardized, thus allowing some freedom of implementation for a scheduling algorithm. However, a typical response could be to avoid scheduling cell-edge users in RBs with high transmit power.

In the definition of the RNTP indicator, transmit power per antenna port is normalized by the maximum output power of a BS or cell, because a cell with a smaller maximum output power, corresponding to smaller cell size, may receive much interference as compared with a cell with a larger maximum output power, corresponding to a larger cell size.

The determination of the RNTP indicator may be performed by Equation 1.

[Equation 1]

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_nom}^{(p)}} \text{ is made} \end{cases}$$

In Equation 1, $E_A(n_{PRB})$ is the maximum intended energy per resource element (EPRE) of UE-specific physical downlink shared channel (PDSCH) REs in orthogonal frequency division multiplexing (OFDM) symbols including no reference signal (RS) in a physical resource block for antenna port p in a specified future time interval, and $n_{PRB}$ is the number of physical resource blocks. $n_{PRB}$ may have a value ranging from 0 to $N_{RB}^{DL}-1$. $RNTP_{threshold}$ may have one value among $\{-\infty, -11, -10, -9, -8, -7, -6, -5, -4, -3, -2, -1, 0, \pm 1, \pm 2, \pm 3\}[dB]$ Further, in Equation 1, $E_{max\_nom}^{(p)}$ may be represented by Equation 2.

[Equation 2]

$$E_{max\_nom}^{(p)} = \frac{P_{max}^{(p)} \cdot \frac{1}{\Delta f}}{N_{RB}^{DL} \cdot N_{SC}^{RB}}$$

In Equation 2, $\Delta f$ denotes subcarrier spacing, $N_{RB}^{DL}$ denotes a downlink bandwidth configuration, and $N_{SC}^{RB}$ denotes a resource block size in the frequency domain, expressed based on the number of subcarriers.

According to Equation 1, the RNTP indicator is 0 when the normalized energy of REs $$\left(\frac{E_A(n_{PRB})}{E_{max\_nom}^{(p)}}\right)$$

is equal to or less than preset $RNTP_{threshold}$, while the RNTP indicator is 1 when no regulation about the upper limit of the normalized energy of REs $$\left(\frac{E_A(n_{PRB})}{E_{max\_nom}^{(p)}}\right)$$

is made. That is, when $$\frac{E_A(n_{PRB})}{E_{max\_nom}^{(p)}}$$

is greater than $RNTP_{threshold}$, the RNTP indicator may be 1.

Meanwhile, a transmitting antenna generates stronger electromagnetic waves in some directions than in other directions. A plot of field strength according to direction is called as the antenna's radiation pattern. The radiation pattern is always the same for receiving as for transmitting.

An electromagnetic wave measured at a point far from the antenna is the sum of radiation from all parts of the antenna. Each small part of the antenna radiates waves of different amplitudes and phases, and each of these waves travels a different distance to the point where a receiver is located. These waves increase a gain in some directions and decrease a gain in some directions.

Figure 2:
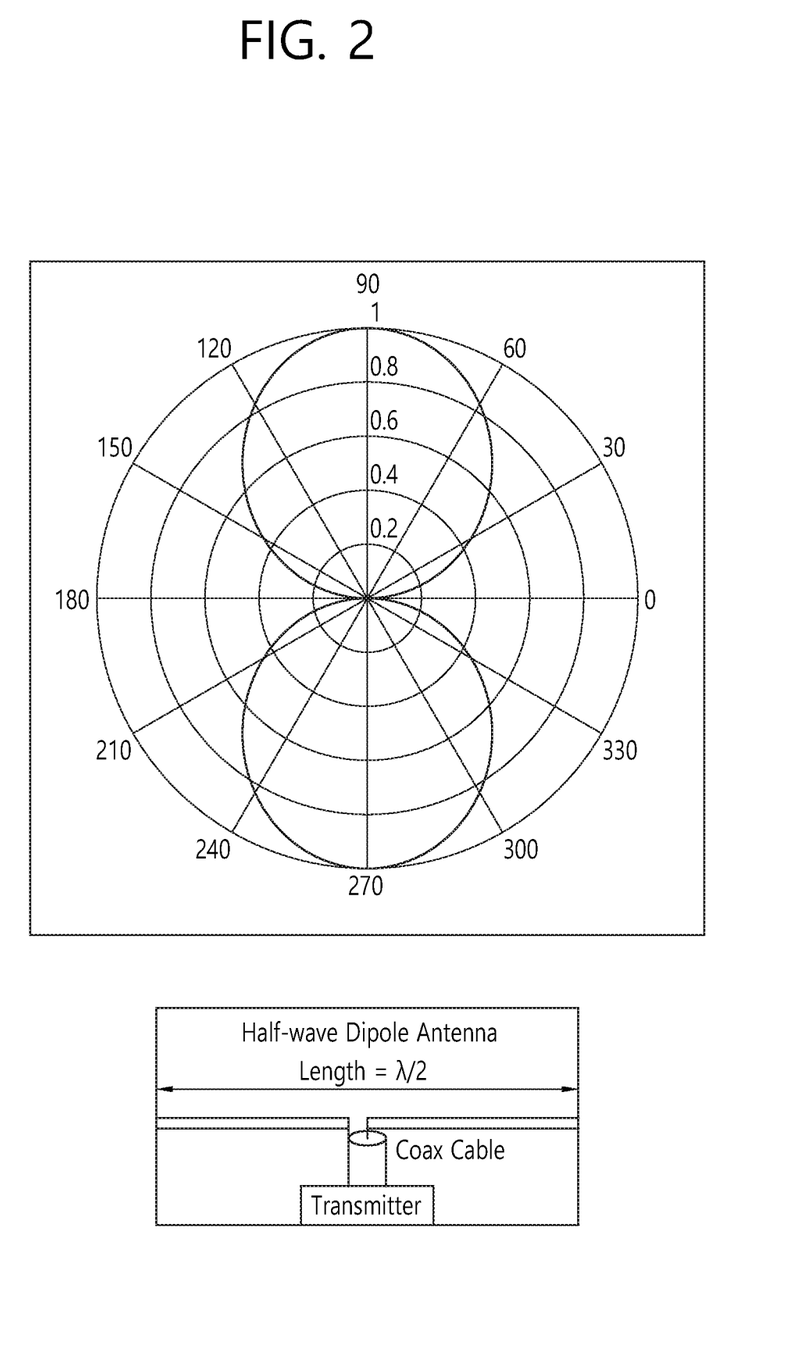
FIG. 2 illustrates a radiation pattern of a half-wave dipole antenna.

A half-wave dipole is a simple antenna that consists of a half wavelength of wire, cut in the center for connection of a cable. FIG. 2 illustrates a radiation pattern of a half-wave dipole antenna.

A directional antenna is designed to have a gain in only one direction and to have a loss in others. An antenna is made directional by increasing a size thereof. A wave radiates from an antenna travels a long distance with a directivity and may be more easily controlled with a directional radiation pattern, whether constructive interference or destructive interference.

Figure 3:
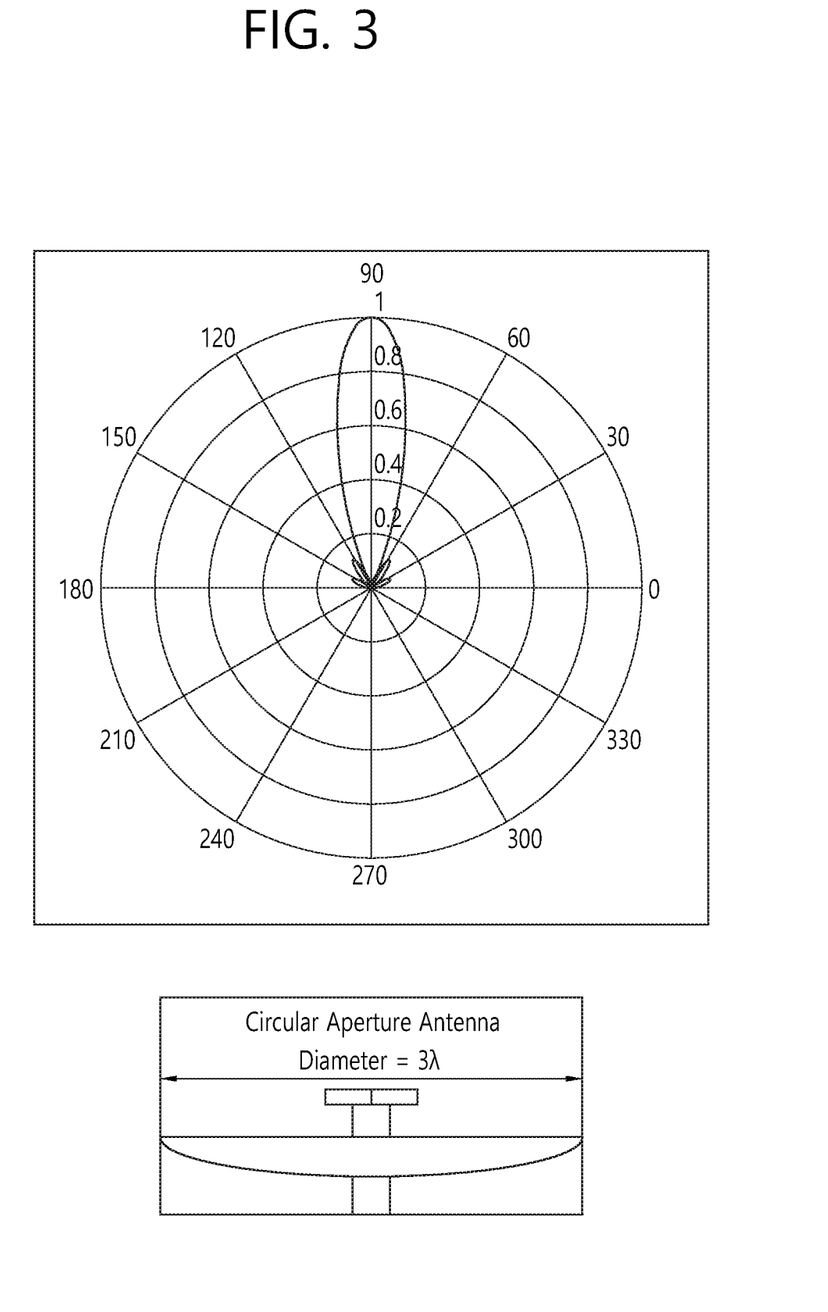
FIG. 3 illustrates a radiation pattern of a circular aperture antenna, such as a satellite dish antenna.

A satellite dish antenna is, simplistically, considered a circular surface that radiates electromagnetic waves equally from all parts. FIG. 3 illustrates a radiation pattern of a circular aperture antenna, such as a satellite dish antenna.

As illustrated in FIG. 3, the radiation pattern has a narrow central beam of high gain. As the diameter of the antenna increases according to wavelength, the central beam gets narrower. Small beams, called side lobes, appear on either side of the central beam. Directions in which a signal has a signal strength of 0 may be called "nulls."

A simple directional antenna includes a linear array of small radiating antenna elements, each of which is provided with identical signals with the same amplitude and phase from one transmitting end. As the total width of the array increases, the central beam becomes narrower. As the number of antenna elements increases, the side lobes become smaller.

Figure 4:
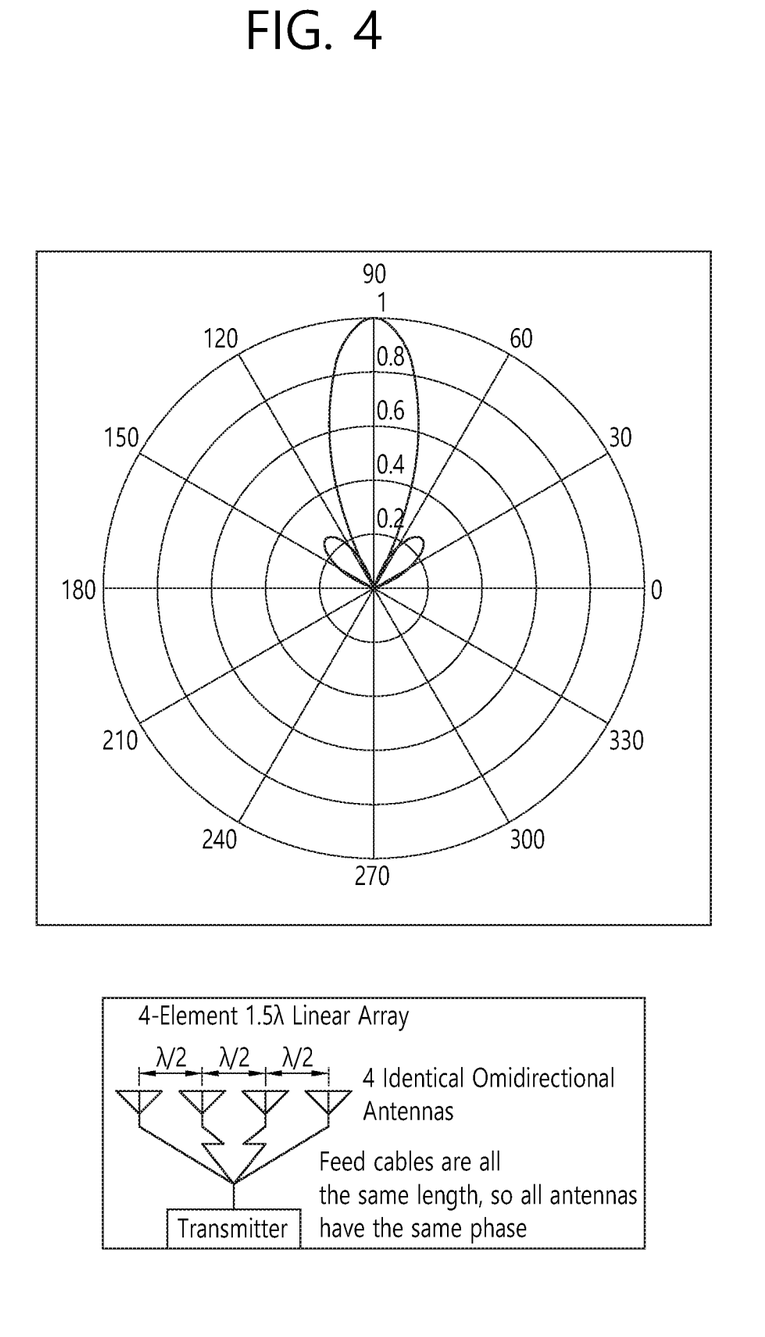
FIG. 4 illustrates a radiation pattern of a linear array antenna.

FIG. 4 illustrates a radiation pattern of a linear array antenna. FIG. 4 shows a radiation pattern of four small antenna elements spaced 1λ/2 apart.

Meanwhile, the radiation pattern of the linear array may be represented by a radiation pattern of a single antenna multiplied by an array factor (AF) representing the effects of constructive interference and destructive interference of each antenna signal. That is, the array factor represents a change in initial antenna gain according to beam width.

Figure 5:
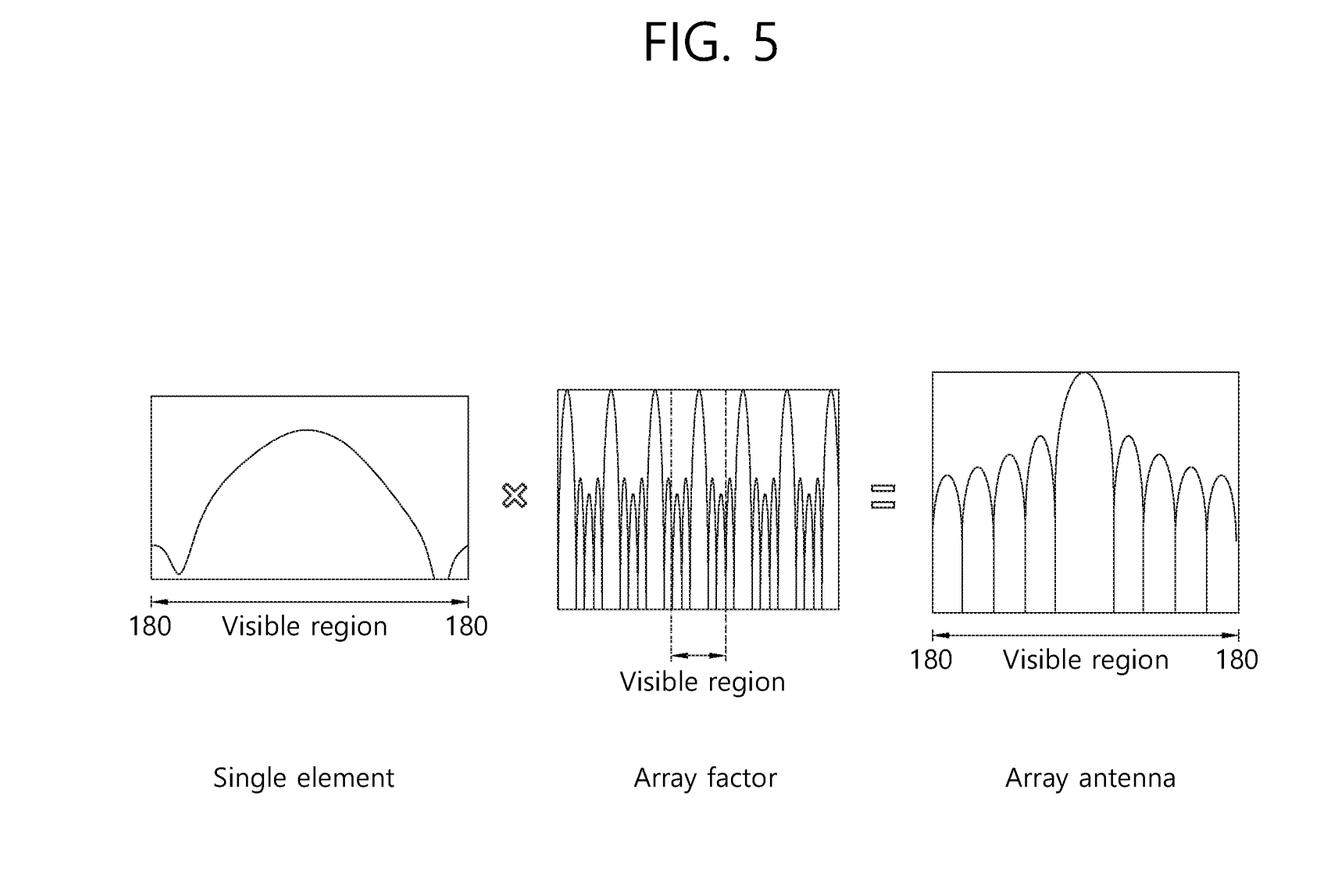
FIG. 5 illustrates a process of obtaining a radiation pattern of a linear array.

FIG. 5 illustrates a process of obtaining a radiation pattern of a linear array. As illustrated in FIG. 5, an antenna gain according to the radiation angle may be obtained by multiplying a radiation pattern ($E_r(\omega)$) of a single element by an array factor.

The array factor may change depending on the number of antennas included in an antenna array, the distance between antennas, and a weight by which each antenna is multiplied. The antenna array may be represented by Equation 3.

$$AF(\theta) = \sum_{n=1}^{N_T} w_n e^{j(n-1)(kd\cos\theta+\phi)} \quad \text{[Equation 3]}$$

In Equation 3, $N_T$ denotes the number of antennas, $w_n$ denotes a weight of each antenna, d denotes the distance between antennas, $k=2\pi/\lambda$ denotes a wave number, θ denotes the angle of the antenna array from a destination point, and φ denotes a phase offset.

When the direction (θ) of a beam directed by the antenna array is 0 and the antennas are equally spaced, the array factor is bilaterally symmetrical based on the directed direction.

When a BS transmits a signal in a direction rotated by x degrees from a boresight at which the antenna is directed, the antenna gain at the destination point of a beam may be represented by $E_r(x)AF(0)$. Further, the beam gain at a point rotated by y degrees from the destination point may be represented by $E_r(x+y)AF(y)$.

As illustrated in FIG. 5, a window (visible region) of the AF may be shifted according to θ applied to the AF, and the final antenna gain is obtained by multiplying the window and a corresponding antenna radiation pattern.

Meanwhile, a massive MIMO system receives attention as a core technology of a next-generation communication system, such as a 5G system, but has a disadvantage of a beam getting narrower with a growing number of antennas. A beam width decrease level of an antenna may be recognized by half power beam width (HPBW). Half power beam width refers to the radiation angle of a beam at which maximum power is reduced by half or greater.

Defining the number of isotropic antennas arranged in a line as NT, the distance between antennas as d, and the wavelength of an electromagnetic wave as λ, half power beam width is represented by Equation 4.

$$HPBW = \frac{\lambda}{(N_T-1)d} \text{ radian} \quad \text{[Equation 4]}$$

Referring to Equation 4, HPBW linearly decreases according to the number of antennas. When the distance between antennas is d=λ/2, Equation 4 may be modified into Equation 5.

When the distance between the BS and a terminal is x (meter), the distance y (meter) of a beam spreading horizontally from point x may be represented by Equation 6.

$$y = 2x \tan\left(\frac{HPBW}{2}\right) = 2x \tan\left(\frac{1}{N_T-1}\right) \quad \text{[Equation 6]}$$

When the BS has four antennas and the distance x between the BS and the terminal is 20 m and 500 m, y is 13.85 m and 346 m, respectively, according to Equation 6. When the BS has 16 antennas and the distance x between the BS and the terminal 20 m and 500 m, y is 2.7 m and 67 m, respectively.

The smaller y is, the narrower beam width is, and an error by a beam direction change increases with narrower beam width. Thus, as the number of antennas increases and the distance between the BS and the terminal is shorter, more accurate beamforming is needed.

The massive MIMO system may achieve a high beam gain by using a large number of antennas but involves a decrease in beam width in return for a high beam gain. To address this problem, a technique for flexibly adjusting beam width in view of the traveling speed and traveling direction of a terminal is proposed.

Figure 6:
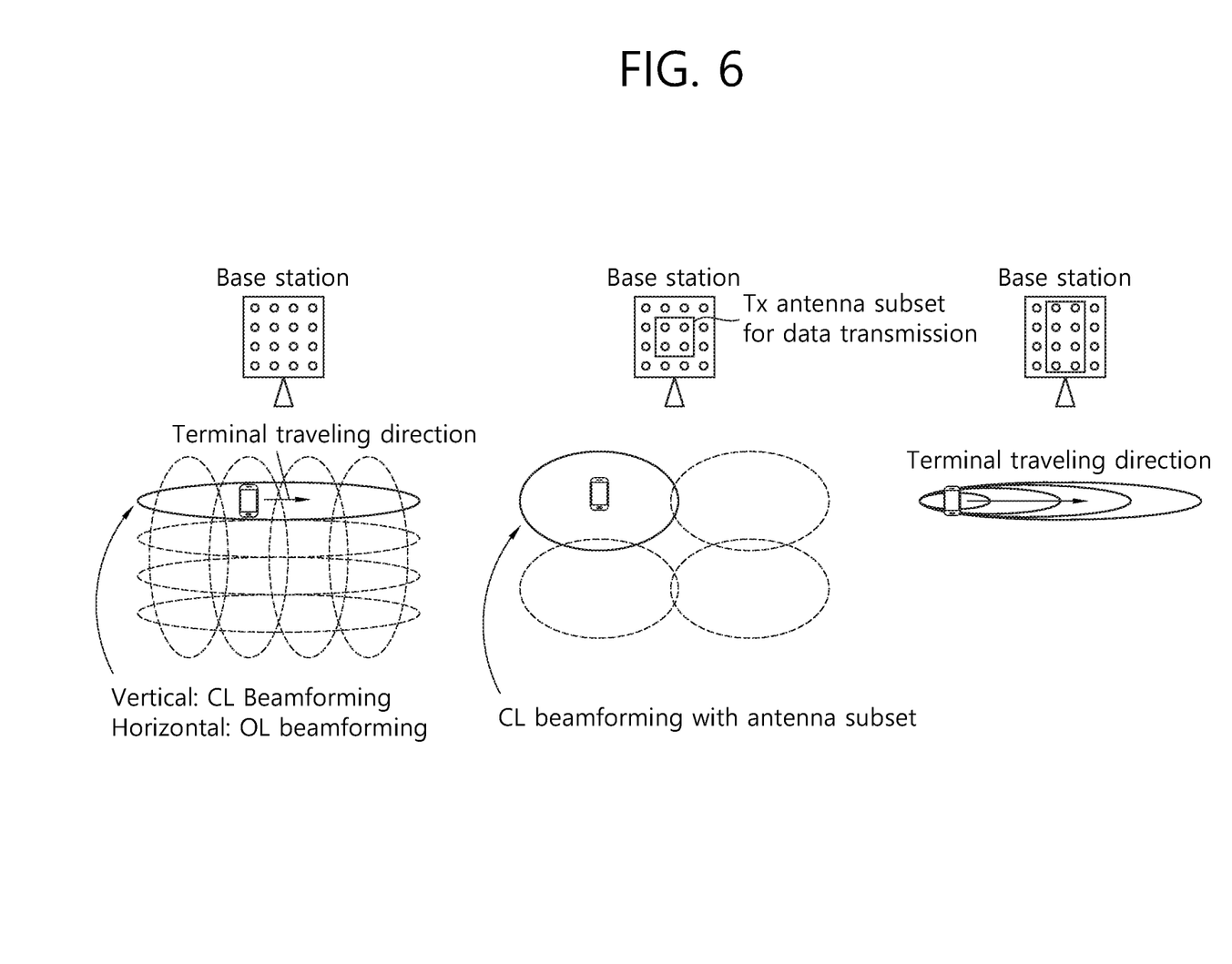
FIG. 6 illustrates an example of flexible beamforming.

FIG. 6 illustrates an example of flexible beamforming.

As illustrated, when a terminal travels in a horizontal direction, open loop beamforming is performed in the horizontal direction and closed loop beamforming is performed in a vertical direction.

Beam width is wide in an open loop beamforming area, while beam width may be adjusted based on feedback information from the terminal in a closed loop beamforming area. Specifically, a BS may adjust the beam width by adjusting $w_n$ in Expression 3.

A terminal in the middle part of FIG. 6 has a lower traveling speed than a terminal in the right part of FIG. 6, and thus a different shape of a beam is formed by the antenna. The size and width of a formed beam may be adjusted according to the traveling speed of a terminal.

As illustrated in the right part of FIG. 6, the shape of a beam may be adjusted in the horizontal direction according to the moving terminal in order to secure the movement of the terminal.

Figure 7:
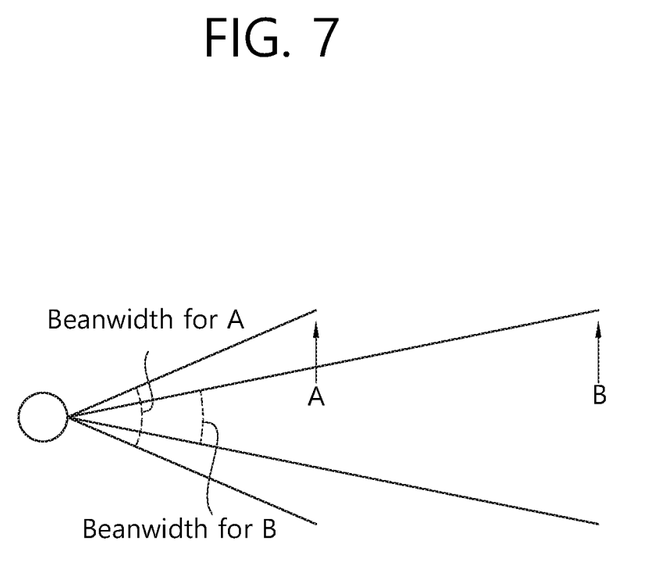
FIG. 7 illustrates the adjustment of beam width according to the speed of a terminal.

FIG. 7 illustrates the adjustment of beam width according to the speed of a terminal.

A beam radiated from an antenna has a feature of spreading wider as becoming more distant from the antenna. Terminal A is moving vertically to a beam direction, being close to a BS, while terminal B is moving vertically to the beam direction, being distant from the BS.

To secure signal transmission according to the movement of terminal A being close to the BS, a beam supplied to terminal A needs to be wider than a beam supplied to terminal B. That is, to secure the mobility of terminals moving close to the BS, a beam for an inner terminal needs to be adjusted wider than a beam for a terminal distant from the BS.

Meanwhile, the partial frequency reuse technology and the inter-cell interference cancellation method using beam width adjustment described above set an RNTP value in order to minimize the strength of an interference signal affecting a terminal.

When a terminal is capable of cancelling interference using an interference cancellation receiver, the terminal may perform inter-cell interference coordination by actively using the interference cancellation capability.

The present invention proposes a technique for exchanging statistical information between BSs in order to increase interference signal cancellation probability in a cell-edge area. Using this technique, the BS may actively allocate a terminal with the interference cancellation capability to an interference cancellation-capable resource, and the blind interference cancellation terminal receives information on interference characteristics of the allocated resource to reduce loads of unnecessarily performing interference cancellation. That is, the blind interference cancellation terminal may determine whether to perform interference cancellation using the interference information on the allocated, thereby reducing loads of unnecessarily performing interference cancellation.

Meanwhile, a blind interference cancellation receiver, that is, a blind interference cancellation terminal, refers to a receiver that is capable of performing interference cancellation although being blind to information on an interference signal that the receiver intends to cancel. The probability of cancelling interference in a specified resource may be determined based on the strength of an interference signal, a modulation scheme of the interference signal, a channel coding scheme, a coding rate, and an MIMO precoding technique. As the strength of an interference signal is stronger than a weak signal and the interference signal has a lower modulation order, interference cancellation probability increases.

A BS of an aggressor cell causing interference may report information on a resource with a high probability of interference cancellation to a BS of an adjacent cell (victim cell). When the information on interference cancellation is received, the BS may allocate a resource with a higher interference cancellation probability to a terminal with the interference cancellation capability.

Terminals with the interference cancellation capability may selectively perform interference cancellation based on the interference cancellation probability of a resource allocated to the terminals, thereby effectively using the interference cancellation receiver.

Hereinafter, the present invention proposes a method of estimating a symbol error rate (hereinafter, "SER") or packet error rate (hereinafter, "PER") in a cell-edge area and reporting a resource convenient for interference cancellation to an adjacent cell based on the estimated SER or PER. An interference cancellation method according to an aspect of the present invention may be used when coordinated multipoint (CoMP) between BSs is not smoothly performed due to a delay in inter-cell signal exchanges, because exchanged signals according to the aspect of the present invention are statistical information.

A BS may provide a signal indicating whether a resource that may affect an adjacent cell is convenient for interference cancellation to a BS responsible for the adjacent cell or a terminal located in the adjacent cell. In the present invention, such signal transmitted and received through an interface between BSs (X2 interface) is defined as an intercell interference cancellation probability (hereinafter, "IICP").

The IICP may refer to an SER or PER in an attempt to cancel a signal in the cell-edge area of the adjacent cell.

In the present invention, on the assumption that a signal transmitted from a BS reaches a cell-edge area, an SER and a PER are respectively defined as an intercell interference symbol error rate (hereinafter, "IISER") and an intercell interference packet error rate (hereinafter, "IIPER"). The IISER and IIPER may be calculated by various methods.

Generally, since each terminal (UE) of a communication system determines the level of a modulation and coding scheme (MCS) based on a target PER, the PER of a signal received by each terminal converges to the target PER with time.

However, since a cell-edge terminal needs to reconstruct such a signal as an interference signal, it is necessary to apply a channel in a different condition from a channel for a terminal receiving such a signal as a data signal. That is, the cell-edge terminal needs to separately calculate the error rate of an interference signal.

According to one aspect of the present invention, an IISER and an IIPER may be calculated based on accumulated channel information.

The BS receives channel information from the terminal and thus may obtain a signal-to-noise-plus-interference ratio (SINR) distribution of a receiving channel thereof based on the channel information. The BS may obtain the SINR average of the bottom x % of users (for example, x≤5) based on the SINR distribution.

Further, when the BS has a bit error rate (BER) or PER curve corresponding to each MCS level and rank, the BS may apply the SINR average of the bottom x % of users to each MCS level, thereby predicting a BER or PER curve for the bottom x % of users.

This obtained BER may be used as an IISER, and the PER may be used as an IIPER. The SINR of the bottom x % of users is used in this scheme, because a terminal located in an adjacent cell, that is, a terminal located in a cell-edge area, is highly likely to be one among the bottom x % of terminals in the cell. Here, regarding a PER, there is a restriction such that an IIPER may be calculated only when the terminal in the adjacent cell completely receives one codeword.

For example, suppose that cell A and cell B are adjacent to each other, and BS A of cell A generates an IICP and reports the IICP to cell B. Cell A and cell B may agree in advance to generate an IISER based on the SINR of the bottom 3% of terminals.

Suppose that cell A is transmitting a single-stream signal to terminal A-1 in cell A and employs 16QAM as a modulation scheme. Further, suppose that cell A is transmitting a multi-stream signal to terminal A-2 in cell A and employs QPSK as a modulation scheme. Suppose that cell A has an SER curve in an additive white Gaussian noise (AWGN) channel for the use of each modulation scheme.

In this case, the BS may estimate the SER of a terminal having the bottom 3% SINR by applying a physical abstraction technique to the SER curves of the modulation schemes of terminal A-1 and terminal A-2. That is, the BS may estimate an IISER using MCS information on terminal A-1 and terminal A-2 and the SINR of the bottom 3% of terminals.

Hereinafter, a method of setting up an IICP using an IISER is described, but the IISER may be replaced with an IIPER in all methods and equations. BSs exchanging IICPs need to recognize whether the IICPs are generated based on an IISER or an IIPER, and such information may be transmitted and received between the BSs.

Further, although an IICP is applied per physical resource block ($N_{PRB}$) in the following description, an IICP may be set per time-domain frame or subframe.

According to one aspect of the present invention, an IICP may be set to 1 when an IISER is greater than a preset target interference cancellation probability, and the IICP may be set to 0 when the IISER is smaller than the target interference cancellation probability.

Since a high IISER means a high probability that a terminal disposed in an adjacent cell decodes a signal, an IICP signal may be generated based on an IISER. If the terminal fails to cancel an interference signal, the probability of decoding a signal of the terminal is reduced, and thus the BS may determine an IICP using the maximum IISER in order to minimize the probability of failure of interference cancellation, which is represented by the following equation.

$$HCP(n_{PRB}) = \begin{cases} 0 & \text{if } p_{max}(n_{PRB}) > HCP_{threshold} \\ 1 & \text{if } p_{max}(n_{PRB}) \le HCP_{threshold} \end{cases} \quad \text{[Equation 7]}$$

In Equation 7, $p_{max}(n_{PRB})$ denotes the maximum value among the IISERs of symbols of a UE-specific PDSCH RE intended to be scheduled for a future time interval, that is, expected to be scheduled in a specified time interval.

When a random terminal receives a multi-stream in an RE of a PDSCH, the terminal simultaneously receives a plurality of symbols via specified PDSCH REs, in which the IISERs of the respective symbols may be individually calculated for comparison.

$IICP_{threshold}$ may be represented by $IICP_{threshold} \in \{1, a_1, a_2, \ldots a_L, 0\}$. $IICP_{threshold}$ equal to 1 may indicate that no IICP is used, while $IICP_{threshold}$ equal to 0 may indicate that interference cancellation may be performed in the entire band.

$a_L$ may be determined in view of the inter site distance of a network, an antenna configuration, a traffic load distribution, a modulation and coding scheme, signal power, or the like.

Referring to Equation 7, an IICP is 0 when $p_{max}(n_{PRB})$ is greater than specified $IICP_{threshold}$, and the IICP is 1 when $p_{max}(n_{PRB})$ is equal to or less than specified $IICP_{threshold}$.

An IICP of 1 indicates a high probability of reconstructing and cancelling interference, while an IICP of 0 indicates a low possibility of reconstructing interference due to a high error rate. A BS receiving the IICP schedules a terminal for a resource with an IICP of 1, so that the terminal may perform interference cancellation.

When the maximum IISER is used for IICP determination, a damage occurring when it is impossible to reconstruct an interference signal may be prevented.

According to another aspect of the present invention, an IICP may be determined using an average IISER, instead of the maximum IISER. When the maximum IISER is used, targets to be subjected to interference cancellation may be reduced more than necessary. Therefore, according to one embodiment of the present invention, an IICP may be determined using an average IISER.

This is represented by the following equation.

$$HCP(n_{PRB}) = \begin{cases} 0 & \text{if } p_{avg}(n_{PRB}) > HCP_{threshold} \\ 1 & \text{if } p_{avg}(n_{PRB}) \le HCP_{threshold} \end{cases} \quad \text{[Equation 8]}$$

In Equation 8, $p_{avg}(n_{PRB})$ denotes the average of the IISERs of symbols of a UE-specific PDSCH RE intended to be scheduled for a future time interval.

When a random terminal receives a multi-stream in an RE of a PDSCH, the terminal simultaneously receives a plurality of symbols via specified PDSCH REs, in which the IISERs of the respective symbols may be individually calculated for comparison.

$IICP_{threshold}$ may be represented by $IICP_{threshold} \in \{1, a_1, a_2, \ldots a_L, 0\}$. $IICP_{threshold}$ equal to 1 may indicate that no IICP is used, while $IICP_{threshold}$ equal to 0 may indicate that interference cancellation may be performed in the entire band.

$a_L$ may be determined in view of the inter site distance of a network, an antenna configuration, a traffic load distribution, a modulation and coding scheme, signal power, or the like.

Referring to Equation 8, an IICP is 0 when $p_{avg}(n_{PRB})$ is greater than specified $IICP_{threshold}$, and the IICP is 1 when $p_{avg}(n_{PRB})$ is equal to or less than specified $IICP_{threshold}$. When an average IISER is used as in Equation 8, there are more resource blocks with an IICP of 0 than when the maximum IISER is used as in Equation 7.

An IICP may be transmitted and received along with a conventional RNTP. If no additional feedback information is generated, the BS transmits only an IICP and may infer information on a cell-edge user from the IICP. Since an MCS level is set to satisfy a target error rate, it is expectable that a cell-edge user has a low IISER or IIPER. That is, when an IISER is high enough to be 1, it may be expected that the BS is transmitting a signal to a cell-edge terminal. When an IISER is low enough to be 0, it may be expected that the BS is transmitting a signal to a terminal in an inner site of a cell.

Meanwhile, the probability that the terminal located in the adjacent cell actually receives interference also depends on the area of an interference signal-spreading region. The IICP may indicate the probability of cancelling interference when the terminal receives an interference signal but has a limitation in representing the probability that the terminal actually receives interference.

According to another aspect of the present invention, to address such a limitation, the BS may set an IICP additionally considering an interfered region, that is, an effect on beam width, as a weight. A weighted IICP (wIICP), obtained by multiplying the IICP in Equation 7 or Equation 8 by interference receiving probability, may be set to 1 when a multiplication of the IISER by beam width is greater than a specific threshold, and may be set to 0 when a multiplication of the IISER by beam width is less than the specific threshold.

The BS may calculate a wIICP by multiplying an IISER, which is the probability that the terminal located in the edge of the adjacent cell decodes an interference signal, by the probability that the terminal receives interference. If the terminal fails to cancel an interference signal, the probability of decoding a signal to be originally received is reduced, and thus the BS may determine an IICP using the maximum IISER in order to minimize the probability of failure of interference cancellation, which is represented by Equation 9.

$$HCP(n_{PRB}) = \begin{cases} 0 & \text{if } \frac{HPBW}{2\pi} \times p_{max}(n_{PRB}) > HCP_{threshold} \\ 1 & \text{if } \frac{HPBW}{2\pi} \times p_{max}(n_{PRB}) \leq HCP_{threshold} \end{cases} \quad \text{[Equation 9]}$$

In Equation 9, $p_{max}(n_{PRB})$ denotes the maximum value among the IISERs of a UE-specific PDSCH RE intended to be scheduled for a future time interval.

HPWB refers to the radiation angle of a beam at which maximum power is reduced by half or greater and may be replaced with beam width (BW) connecting null points of the beam.

$IICP_{threshold}$ may be represented by $IICP_{threshold} \in \{1, a_1, a_2, \ldots a_L, 0\}$. $IICP_{threshold}$ equal to 1 may indicate that no IICP is used, while $IICP_{threshold}$ equal to 0 may indicate that interference cancellation may be performed in the entire band.

$a_L$ may be determined in view of the inter site distance of a network, an antenna configuration, a traffic load distribution, a modulation and coding scheme, signal power, or the like.

$p_{max}(n_{PRB})$ in Equation 9 may be replaced with $p_{avg}(n_{PRB})$ in Equation 8.

Meanwhile, according to another aspect of the present invention, the BS may determine an IICP basically by applying Equation 9, in which a beam gain difference based on a beam radiation direction may be considered in calculating $p_{max}(n_{PRB})$. For example, suppose that an antenna gain in a beam directing direction is AG(0) and an antenna gain in an area deviating by x is AG(x). If a beam with a beam width of 2x is multiplied as a weight, an SNR reduced by AG(x)/AG(0) may be used in calculating $p_{max}(n_{PRB})$.

The interference cancellation probabilities according to the foregoing equation, that is, the IICPs, may represent two kinds of information using one bit. According to another aspect of the present invention, the interference cancellation probabilities may be expressed in two-bit or more signals, in which case the interference cancellation probabilities may represent probabilities of different phases of interference cancellation.

Figure 8:
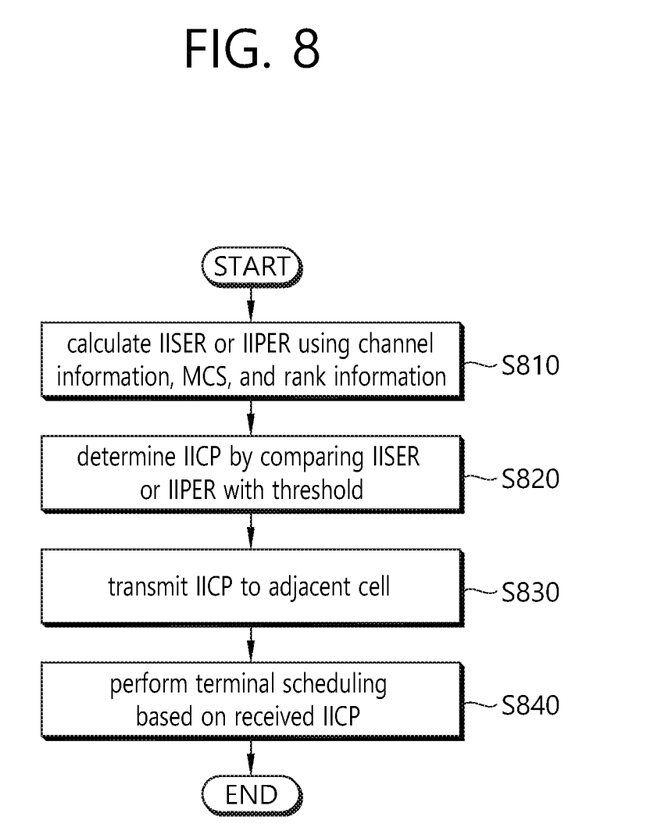
FIG. 8 illustrates a signal transmission method according to one embodiment of the present invention.

FIG. 8 illustrates a signal transmission method according to one embodiment of the present invention.

Referring to FIG. 8, a method of transmitting interference cancellation information according to the present embodiment is described below.

First, a signal transmission device capable of transmitting a signal to a terminal, such as a BS, may calculate an IISER or IIPER using at least one of channel information, an MCS level, and rank information (S810).

The BS may acquire an SINR distribution of a channel based on the channel information received from the terminal and may calculate an average SINR of a lower proportion of users based on the SINR distribution.

Further, the BS may calculate a BER or PER for the lower proportion of users using a BER or PER curve corresponding to the MCS level and the rank. When the MCS level or the rank is high, the error rate may increase. This BER or PER may be used as an IISER or IIPER for a signal reaching a cell-edge area.

The BS may compare the calculated IISER or IIPER with a threshold to determine an IICP (S820).

The IICP is an indicator representing the probability in an interference signal is cancelled in the cell-edge area. An IICP equal to 1 may indicate a high probability that an interference signal is reconstructed to cancel interference, while an IICP equal to 0 may indicate that it is impossible or unnecessary to cancel an interference signal due to a too high error rate.

The IISER or IIPER, compared with the threshold to determine the IICP, may be the maximum or average IISER or IIPER.

Further, a factor for beam width may be added as a weight to the maximum or average IISER or IIPER in order to consider that an interference signal may be received.

When the IICP is determined based on various conditions and operations, the BS may transmit the determined IICP to an adjacent cell (S830).

The IICP may be transmitted to the terminal through a BS of the adjacent cell or be provided directly to the terminal. The terminal including an interference cancellation receiver may determine whether to cancel interference according to the IICP to perform interference cancellation.

The BS transmitting the IICP may also receive information on the IICP from the BS of the adjacent cell and may perform scheduling for the terminal based on the received IICP (S840).

The BS receiving the IICP may allocate data for the terminal to a resource with an IICP of 1, since it is easy to reconstruct and cancel an interference signal in the resource with an IICP of 1.

However, the BS may determine that it is difficult to reconstruct and cancel an interference signal in a resource with an IICP of 0 and thus may not schedule the terminal in the resource.

As described above, the BS may determine interference cancellation probability in view of a channel state, an MCS, or the like and may provide an adjacent cell with an indicator indicating whether it is easy to cancel interference.

The adjacent cell may perform terminal scheduling for a specific resource according to indicator information.

Figure 9:
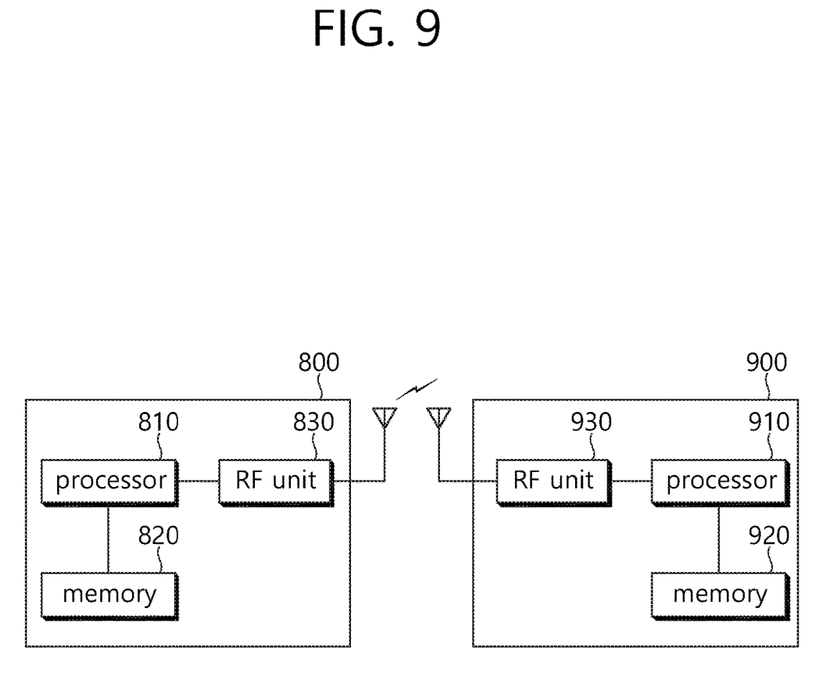
FIG. 9 is a block diagram of a wireless communication system according to one embodiment of the present invention.

FIG. 9 is a block diagram of a wireless communication system according to one embodiment of the present invention.

A BS 800 includes a processor 810, a memory 820, and a radio frequency (RF) unit 830. The processor 810 implements the proposed functions, procedures, and/or methods. Layers of wireless interface protocols may be implemented by the processor 810. The memory 820 is connected with the processor 810 and stores various pieces of information to operate the processor 810. The RF unit 830 is connected with the processor 810 and transmits and/or receives radio signals.

A terminal 900 includes a processor 910, a memory 920, and a radio frequency (RF) unit 930. The processor 910 implements the proposed functions, procedures, and/or methods. Layers of wireless interface protocols may be implemented by the processor 910. The memory 920 is connected with the processor 910 and stores various pieces of information to operate the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, the present invention proposes a method of setting up an RNTP value to perform inter-cell interference cancellation in a flexible beamforming-applied communication system.

Although the methods have been described in the foregoing embodiments on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for transmitting interference cancellation information, the method comprising:
   estimating a symbol error rate or a packet error rate in a cell-edge area based on feedback information received from a terminal belonging to a cell controlled by a predetermined base station;
   determining a probability indicator that indicates a probability of cancelling inter-cell interference in the cell-edge area by comparing the symbol error rate or the packet error rate with a predetermined threshold;
   transmitting information on the probability indicator to an adjacent cell, and
   transmitting scheduling information based on the probability indicator to the terminal.

2. The method of claim 1, wherein the symbol error rate or the packet error rate is estimated based on a level of a modulation and coding scheme.

3. The method of claim 1, wherein the probability indicator is generated per physical resource block.

4. The method of claim 3, wherein the probability indicator indicates a high interference cancellation probability in the cell-edge area when a maximum value of the symbol error rate or the packet error rate for a resource block intended to be scheduled for a specified time is less than the threshold.

5. The method of claim 3, wherein the probability indicator indicates a low interference cancellation probability in the cell-edge area when a maximum value of the symbol error rate or the packet error rate for a resource block intended to be scheduled for a specified time is greater than the threshold.

6. The method of claim 3, wherein the probability indicator indicates a high interference cancellation probability in the cell-edge area when an average value of the symbol error rate or the packet error rate for a resource block intended to be scheduled for a specified time is less than the threshold.

7. The method of claim 3, wherein the probability indicator indicates a low interference cancellation probability in the cell-edge area when an average value of the symbol error rate or the packet error rate for a resource block intended to be scheduled for a specified time is greater than the threshold.

8. The method of claim 1, wherein the probability indicator is generated per physical resource block, and the method further comprises receiving the probability indicator from a base station of the adjacent cell and scheduling a terminal for a resource of the probability indicator when the probability indicator indicates a high probability of cancelling inter-cell interference in the cell-edge area.

9. A signal transmission device for transmitting interference cancellation information comprising:
   a signal transceiver; and
   a processor connected to the signal transceiver,
   wherein the processor estimates a symbol error rate or a packet error rate in a cell-edge area based on feedback information received from a terminal belonging to a cell, determines a probability indicator that indicates a probability of cancelling inter-cell interference in the cell-edge area by comparing the symbol error rate or the packet error rate with a predetermined threshold, and transmits information on the probability indicator to an adjacent cell and transmits scheduling information based on the probability indicator to the terminal.

10. The signal transmission device of claim 9, wherein the symbol error rate or the packet error rate is estimated based on a level of a modulation and coding scheme.

11. The signal transmission device of claim 9, wherein the signal transceiver receives the probability indicator which is generated per physical resource block from a base station of the adjacent cell, and
   the processor schedules the terminal for a resource of the probability indicator when the probability indicator indicates a high probability of cancelling inter-cell interference in the cell-edge area.

* * * * *